United States Patent
Schweighoffer et al.

(10) Patent No.: US 6,928,744 B2
(45) Date of Patent: Aug. 16, 2005

(54) MEASURING DEVICE

(75) Inventors: Craig Schweighoffer, Carinbah (AU); Jake Tyson, East Ryde (AU)

(73) Assignee: Redback Tools Pty. Ltd. (AU)

( * ) Notice: Subject to any disclaimer, the term of this patent is extended or adjusted under 35 U.S.C. 154(b) by 0 days.

(21) Appl. No.: 10/741,206

(22) Filed: Dec. 19, 2003

(65) Prior Publication Data
US 2004/0216321 A1 Nov. 4, 2004

(30) Foreign Application Priority Data
Dec. 19, 2002 (AU) .......................... 2002101042

(51) Int. Cl.$^7$ ................................ G01B 3/10
(52) U.S. Cl. ............................ 33/755; 33/761; 33/769
(58) Field of Search .................... 33/755, 760, 761, 33/768, 769, 770

(56) References Cited

U.S. PATENT DOCUMENTS

| | | | |
|---|---|---|---|
| 3,672,597 A | * 6/1972 | Williamson | .................. 33/761 |
| 4,665,620 A | * 5/1987 | Osteen | .................. 33/760 |
| 4,766,673 A | 8/1988 | Bolson | |
| 4,786,010 A | 11/1988 | Dynan | |
| 4,965,944 A | 10/1990 | Kuze et al. | .................. 33/760 |
| 5,079,851 A | * 1/1992 | Sill | .................. 33/760 |
| 5,459,942 A | * 10/1995 | Hintz, Jr. | .................. 33/768 |
| 5,575,506 A | * 11/1996 | Gardenhour et al. | .......... 33/760 |
| 5,845,413 A | * 12/1998 | Zayat, Jr. | .................. 33/760 |
| 6,233,789 B1 | 5/2001 | Douglas | |

FOREIGN PATENT DOCUMENTS

| | | |
|---|---|---|
| GB | 2 273 985 A | 7/1994 |
| JP | 2000-002501 | 1/2000 |

* cited by examiner

*Primary Examiner*—Christopher W. Fulton
(74) *Attorney, Agent, or Firm*—Lerner, David, Littenberg, Krumholz & Mentlik, LLP

(57) ABSTRACT

A length measuring device. The device comprises a length measuring portion and a measuring portion housing. Measurement recording means is provided on at least a portion of the housing surface.

8 Claims, 1 Drawing Sheet

MEASURING DEVICE

FIELD OF THE INVENTION

The present invention relates to a measuring device and, more particularly, to a length-measuring device, which is configured to provide a user with improved functionality.

BACKGROUND OF THE INVENTION

When using measuring devices such as tape measures, it is important to ensure that not only is a measurement accurately obtained, but that the measurement is accurately recorded. The more time-consuming and difficult it is for an individual to record a measurement, the greater the likelihood that the individual will record the measurement inaccurately.

One method for recording a measurements) obtained using a measuring device is to write the measurement on a piece paper. The use of paper has been shown to be less than ideal in many situations. Many individuals, for example tradesmen, often record a multitude of measurements on a daily basis and therefore impractically require a constant supply of paper. Further, a measurement recorded on a piece of paper is easily confused with other recorded measurements. Also, loose pieces of paper are prone to being misplaced or confused with other pieces of paper.

The use of a notepad or the like to consolidate a number of pieces of loose leaf paper only partially addresses the above referred problems associated with using loose leaf paper. Recorded measurements are still prone to be confused with previously recorded measurements. Further, a notepad is undesirably an extra item to be carried (and potentially misplaced) by the individual.

Therefore, there exists a need to provide a portable and easy to use measurement recording device.

SUMMARY OF THE INVENTION

In a broad aspect of the present invention, there is provided a length-measuring device. The device includes a length-measuring portion. The device also includes a housing, and a measurement recording means provided on the housing surface.

In a preferred aspect, the measuring portion is flexible and elongate. Preferably, the measuring portion is also retractable into the housing for storage and extendable from the housing for use.

The measuring portion and the housing could adopt any conventional or non-conventional form and be of any practical size.

Most preferably, the measurement recording means includes a writing surface provided on at least a portion of the housing surface.

It is envisaged that the housing will include at least two substantial surfaces. In this configuration, the writing surface is preferably provided on at least one of the substantial housing surfaces.

The writing surface could adopt any suitable form. The writing surface may be written upon using a pencil. It is to be appreciated that in another embodiment a variety of writing mediums could be used on the writing surface, including, for example, pencil, chalk, crayon and in some instances certain types of biro and marker ink.

The writing surface may enable the writing to be removed once it is no longer required. In this way, the writing surface can be re-used for recording another measurement or set of measurements.

The writing surface may be manufactured separately to the housing, and either permanently or releasably attached to the housing. Alternatively, the writing surface may be integral with the housing. An example of the latter is to provide at least a portion of the housing surface as a writing surface.

The writing surface may be suitably textured for ease of writing thereon. In one form, the writing surface is, in profile, a repeating trough and peak profile. The repeating trough and peak profile may be wave-like or sinusoidal. However, it is to be appreciated that other profiles could also be adopted.

The height between troughs and peaks may be between 5 microns and 125 microns. More particularly, the height may be 25 microns.

The writing surface (or other part(s) of the measuring device) could be permanently adorned with information or designated areas/portions to assist the user in the recordal of information. For example, the writing surface could include a grid-like template to assist in the systematic recordal of a number of measurements.

The writing surface(s) may be initially provided with a removable protective covering, which is removed prior to first use of the writing surface. The protective covering is provided to minimise damage to the writing surface between the manufacture and first use. The protective covering could be a tear-off or more preferably a peel-off plastic film. The protective covering may be discarded upon removal from the writing surface(s) prior to use of the writing surface. However, it is to be appreciated that, if desired, the protective covering could be re-used to protect the writing surface(s) after being used for the first time.

The present invention has, so far, been described primarily for recording of measurements. However, it is important to appreciate that the device could be used to record any other type of information, including, for example, names, addresses, telephone numbers, job material and/or tooling requirements and the like.

It will be convenient to hereinafter describe preferred embodiments of the invention with reference to the accompanying drawing. The particularity of the drawing is to be understood as not limiting the preceding broad description of the invention.

DETAILED DESCRIPTION OF THE DRAWING

Figure 1:
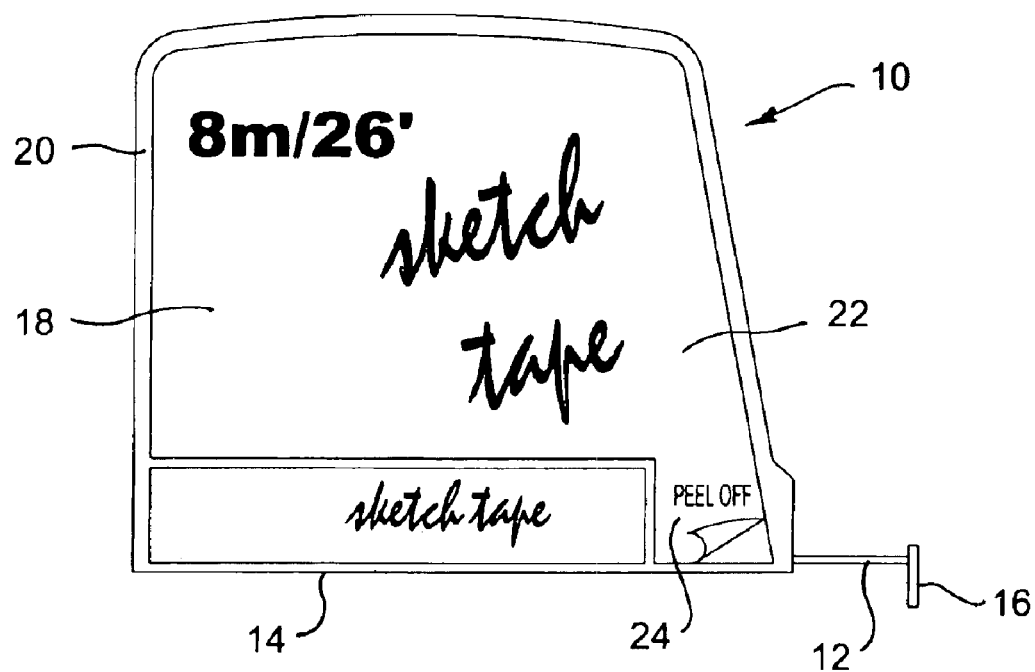
FIG. 1 is a side view of a length-measuring device according to one aspect of the present invention.

Referring to FIG. 1, there is respectively provided a length-measuring device 10. The device 10 includes an elongate length-measuring portion 12 and a housing 14. In the illustrated embodiment, the length-measuring portion 12 and the housing 14 are configured in the form of a retractable tape measure, such that the length measuring portion 12 (or tape) is retractably extendable from within the housing 14.

Only the distal end 16 of the portion 12 is visible. The remainder of the portion 12 is contained within the housing, with the proximal end (not illustrated) of the portion 12 being connected to a recoil/retracting mechanism within the housing 14.

The portion 12 could be manufactured from any suitable material and, in the illustrated embodiment is manufactured from a steel ribbon. The portion 12 is provided along at least one side with a length scale.

The housing 14 is manufactured from plastic, in particular a polycarbonate type material. However, it is to be appreciated that other suitable materials such as metal and other plastics could also be used to manufacture the housing.

The device 10 includes a measurement recording means in the form of a writing surface 18 provided on the side 20 of the housing 14. Indeed, the writing surface 18 forms the outer surface layer of the side 20 of the housing 14. The writing surface 18 provides a convenient location for the recordal of information, and particularly for the recordal of measurements taken when using the device 10.

In the illustrated embodiment only one housing side 20 is provided with a writing surface 18. However, it is to be appreciated that the other housing surfaces could also include writing surfaces, if desired.

The writing surface 18 is suitably textured to facilitate ease of writing thereon. Specifically, the writing surface is, in profile, a trough and peak profile of a sinusoidal shape. The height between troughs and peaks is 25 microns. However, it is to be appreciated that the height could be larger or smaller and preferably between 5 microns and 125 microns.

The writing surface is designed to be re-usable, such that measurements and other information thereon can be discarded simply by rubbing or wiping off.

The writing surface 18 has been specifically designed for writing thereon with pencil. However, the writing surface could also be designed for use with other writing mediums such as biro ink, marker ink, chalk and crayon The device 10 is initially provided with a removable protective film (or covering) 22. The protective film 22 is provided to prevent damage to the writing surface 18 prior to first use of the writing surface 18. The protective film 22 is removed in order to record a measurement(s) or other information on the writing surface 18. It is intended that the film 22 would be peeled off and discarded upon removal from the writing surface 18. However, the covering could be reusable, thereby protecting the writing surface 18 when not in use.

The protective film 22 could be manufactured from any suitable material, and in the illustrated embodiment is manufactured from a printed plastic pressure sensitive film. The film 22 is bonded to the writing surface 18 using an adhesive. However, any suitable method could be used to bond the film 22 to the writing surface 18.

The protective film 22 is provided with a corner tab 24 to facilitate easy removal of the film 22 from the writing surface 18.

The present invention is portable, because is successfully integrates a length measurement (or other information) recording device such as a writing surface with a length measuring device such as a tape measure. Thus, the user need not separately handle both the recording device and the measuring device to record a measurement. Instead, measurements and other information can be recorded directly onto the writing surface provided on the side of the measuring device. This also lessens the likelihood of the user inadvertently misplacing recorded measurements and other recorded information.

Further, the measurements and other information can be easily discarded when no longer required by simply wiping or rubbing off the writing surface 18.

Finally, it is to be understood that various alterations, modifications and/or additions may be introduced into the construction and arrangement of the parts previously described without departing from the spirit or ambit of this invention.

What is claimed is:

1. A retractable tape measure, comprising:
   an elongate length measuring portion is which is retractably extendable from within a housing,
   a measurement recording surface integrally formed on at least a portion of a housing surface,
   the measurement recording surface comprising a re-useable and textured surface for writing thereon with a pencil,
   the textured writing surface including a removable plastic film for protecting the writing surface prior to initial use of the textured writing surface, and
   the textured writing surface having a repeating peak and trough profile, with the height between peaks and troughs being 25 microns.

2. A retractable tape measure, comprising:
   an elongate length measuring portion is which is retractably extendable from within a housing,
   a measurement recording surface integrally formed on at least a portion of a housing surface,
   the measurement recording surface comprising a re-useable and textured surface for writing thereon with a pencil,
   the textured writing surface including a removable plastic film for protecting the writing surface prior to initial use of the writing surface, and
   the textured writing surface having a repeating peak and trough profile, with the height between peaks and troughs being between 5 microns and 125 microns.

3. A retractable tape measure, comprising:
   an elongate length measuring portion is which is retractably extendable from within a housing,
   a measurement recording surface integrally formed on at least a portion of a housing surface,
   the measurement recording surface comprising a re-useable writing surface,
   the writing surface having a repeating peak and trough profile, with the height between peaks and troughs being between 5 microns and 125 microns.

4. A length-measuring device including:
   a length measuring portion;
   a measuring portion housing;
   a measurement recording means provided on at least a portion of the housing surface;
   wherein the measurement recording means includes a writing surface provided on at least a portion of the housing surface; and
   wherein the writing surface is, in profile, a repeating peak and trough profile, with the height between peaks and troughs between 5 microns and 125 microns.

5. A length-measuring device according to claim 4, including removable plastic film for protecting the writing surface prior to initial use of the writing surface.

6. A length-measuring device according to claim 4, wherein the device is a retractable tape measure, having an elongate length measuring portion is which is retractably extendable from within the housing.

7. A length-measuring device according to claim 4, wherein the writing surface is, in profile, a repeating peak and trough profile, with the height between peaks and troughs being 25 microns.

8. A length-measuring device according to claim 4, wherein the measurement recording surface comprising a re-useable and textured surface for writing thereon with a pencil.

* * * * *

UNITED STATES PATENT AND TRADEMARK OFFICE
CERTIFICATE OF CORRECTION

PATENT NO. : 6,928,744 B2
DATED : August 16, 2005
INVENTOR(S) : Craig Schweighoffer and Jake Tyson It is certified that error appears in the above-identified patent and that said Letters Patent is hereby corrected as shown below:

Column 1,
Line 17, insert opening parentheses in "measurement(s)".
Line 19, insert -- of -- between "piece" and "paper".

Column 2,
Line 25, change "minimse" to -- minimize --.
Line 65, insert a comma after "embodiment".

Column 3,
Line 28, insert a period after "crayon".
Line 49, delete the second occurrence of "is" and replace with -- it --.

Column 4,
Lines 3, 17, 31 and 56, delete the word "is" after "portion".
Line 63, delete "comprising" and replace with -- comprises --.

Signed and Sealed this

Twenty-second Day of November, 2005

JON W. DUDAS
*Director of the United States Patent and Trademark Office*